April 15, 1969   J. W. ROSS   3,438,886
ORGANIC LIQUID ION-EXCHANGER ELECTRODE
Filed March 14, 1966

INVENTOR.
JAMES W. ROSS
BY
Robert J. Schiller
ATTORNEY

3,438,886
ORGANIC LIQUID ION-EXCHANGER ELECTRODE
James W. Ross, Newton, Mass., assignor to Orion Research, Incorporated, Cambridge, Mass., a corporation of Massachusetts
Filed Mar. 14, 1966, Ser. No. 534,052
Int. Cl. B01k 3/10
U.S. Cl. 204—195        8 Claims

ABSTRACT OF THE DISCLOSURE

This invention is an electrochemical electrode for detecting ion activity in solution and having an organic ion-exchanger liquid as the ion-sensitive portion. The electrode includes membrane formed with an interconnected porous structure open to the surfaces and preferentially wettable by the liquid. There are also a pair of reservoirs, one containing the ion-exchanger liquid and abutting peripheral portions of the membrane; the other containing an internal reference electrolyte solution and abutting a central portion of the membrane. The membrane serves as a wick to maintain a layer of the exchanger liquid between the reference solution and the solution in which the activity of ions is to be determined.

---

Figure 1:
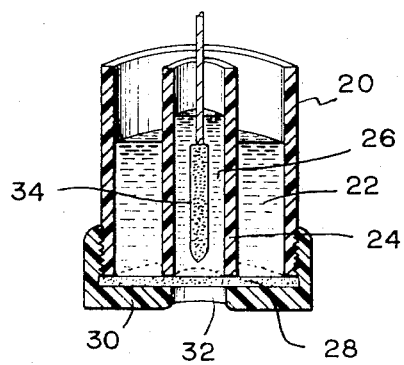

This application relates to electrochemical analysis and more particularly to an improved structure for an electrochemical analytic electrode.

Concentrations of ionic species in solutions have long been determined by a known technique involving an ion-sensitive electrode and a reference electrode in contact with the solution. The electrodes constitute an electrochemical cell in which the half-cell potential at the reference electrode is substantially constant under standard temperature conditions and the half-cell potential of the ion-sensitive electrode is a function of the activity or concentration of the ionic species according to the well-known Nernst equation. Thus, the total potential between the electrodes is approximately proportional to the logarithm of the ionic activity and can readily be ascertained, usually with a high input impedance potentiometrc device. A number of such ion-sensitive electrodes are known, such as the glass electrodes sensitive or response to $H^+$, $Na^+$, $K^+$, and others, typically non-glass electrodes e.g. the Ag-AgCl electrode sensitive to $Cl^-$.

It has also been found that a Nernstian response to divalent as well as monovalent ions in aqueous solution can be elicited by an electrode wherein the ion-sensitive surface is defined by a body of ion-exchange liquid, for example, a salt of a phosphoric acid ester dissolved in a solvent, such as decanol, which is substantially immiscible with water. Such electrodes are described in Belgian Patent No. 668,409.

In the use of this latter type of electrode certain problems arise. If the aqueous and organic phases are in massive contact with one another, relative to their volumes, a local layer depleted of the ions of the solution will arise at the interface due to the high rate of ion-exchange. Although this local depletion layer can be broken up by stirring, the latter is not always possible or complete; such local depletion layer is thus the source of possible errors known as stirring artifacts. Secondly, in any such ion-exchange process, the aqueous phases tend to become ultimately contaminated with ions from the exchanger. Further, because there is usually a finite solubility, albeit very small, of the exchanger in the aqueous phase, the exchanger in time will tend to leach out of the organic phase. Lastly, if the organic phase has ion-concentration gradients due to massive exchange at the interface, the potential measured by the electrode will exhibit instability.

The present invention therefore has as a principal object, the provisions of a novel and improved electrode structure for electrodes incorporating an ion-exchange liquid. More specifically, an object of the present invention is to provide such an electrode incorporating means for limiting ion transfer between the two phases while maintaining the concentration of ion exchanger in the ion-exchange liquid phase at a substantially constant level. A further object is to stabilize rapidly concentration gradients in the organic phase. To this end, the present invention generally comprises a body of electrolyte and a body of ion-exchange liquid substantially immiscible with the electrolyte and separate therefrom; a porous membrane having interconnected voids or pores and being preferentially wettable by the ion-exchange liquid, the membrane being positioned so that respective portions thereof are in contact with both bodies, thereby providing through the membrane the only path allowing liquid transport between the bodies; and means sealing the membrane from contact with the solution under test except for a surface opposite to the surface of that portion contacted by the electrolyte.

Other objects of the invention will in part be obvious and will in part appear hereinafter. The invention accordingly comprises the apparatus possessing the construction, combination of elements, and arrangements of parts which are exemplified in the following detailed disclosure, and the scope of the application of which will be indicated in the claims.

Figure 2:
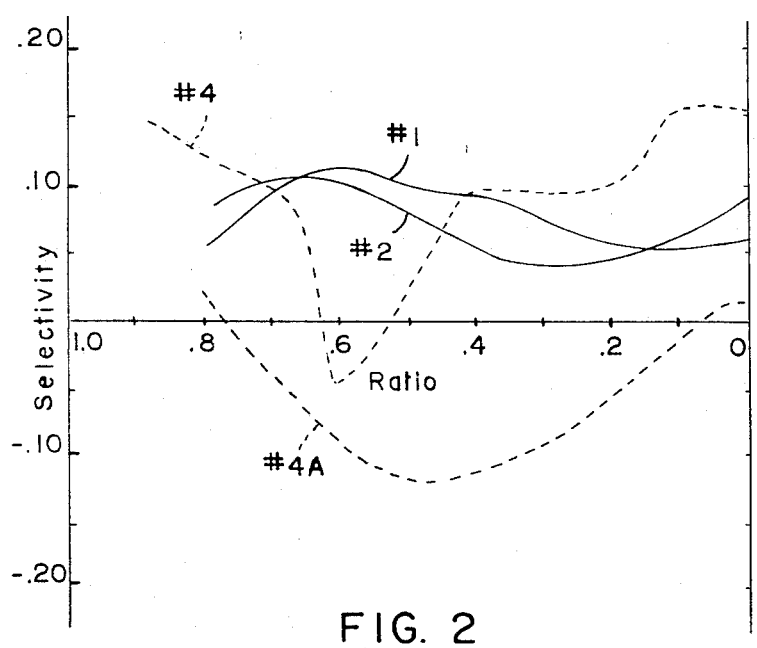

For a fuller understanding of the nature and objects of the present invention, reference should be had to the following detailed description taken in connection with the accompanying drawing wherein:

FIG. 1 is an elevational perspective view of a section through an electrode embodying the principles of the present invention, and FIG. 2 is a graphical representation showing the reproducibility of measurement by electrodes of the type shown in FIG. 1 compared to electrodes of the prior art.

Referring now to FIG. 1 of the drawing there is shown an embodiment of an electrode including means such as tubular enclosure 20, for containing a body of ion-exchange liquid 22, and means, such as coaxial tubular enclosure 24, for containing a body of electrolyte 26. Because enclosure 24 is disposed within enclosure 22 it forms a partition or impermeable barrier between liquid 22 and electrolyte 26. Both enclosures are formed of electrically insulating material substantially chemically inert to the electrolyte and to the ion-exchange liquid, and typically can be a synthetic polymer such as polytetrafluorethylene, ordinary high resistivity glass, imporous ceramic or the like.

The phrase "liquid ion-exchange" and variations thereof, refers to liquid systems of at least two immiscible phases whereby interchange of ions can occur at an interface between the two phases due to a metathetical reaction.

The ion-exchange liquid can either be a liquid ion-exchanger per se or an organic solvent having an ion-exchange material, either normally liquid or solid, dissolved therein, and is substantially immiscible with, i.e. is neither solvent for nor soluble in, the electrolyte. Among typical ion-exchangers which are normally liquid are such materials as organophosphoric acids and certain salts (e.g. di-2-ethylhexylphosphoric acid and calcium bis-di-2-ethylhexylphosphate), carboxylic acids and their salts (e.g. caproic and caprylic acids), perfluorocarboxylic acids and their salts (e.g. perfluorobutyric acid), and a number of amines (e.g. N-trialkyl methyl amine, N-lauryl-N-trialkylmethylamine, and N,N,N-triisooctylamine).

As noted, the ion-exchanger liquid can be a normally solid ion-exchanger dissolved in a solvent, in which instance it is preferred to use a solid ion-exchanger that cannot readily be leached from its solvent by an aqueous phase in contact therewith. Typical examples of such exchangers are diocadecylamine, nonadecylphosphoric acid and dinonylnaphthalene sulfonic acid. These, among others, are very soluble in some organic solvents and substantially insoluble in water. The solvent in which these are dissolved to form the ion-exchange liquid typically can be decanol, dioctylphenylphosphonate, and a number of other liquids all characterized as being quite immiscible with water.

Both enclosures 20 and 22, as shown, are "open" at least at one end of each, these "open" ends terminating in a common plane. Across and in sealing relation to the open ends of the enclosures, is positioned membrane 28. The latter is formed as a sheet of electrically insulating material substantially chemically inert to the organic and aqueous phases which it is intended to contact. The membrane is further characterized in that it contains a multiplicity of voids or pores, the majority of which are interconnected within the bulk of the membrane (i.e. not closed), and a substantial number of which open upon the surfaces of the membrane. Also, the membrane is of a material which is preferentially wettable by the ion-exchange liquid phase. For example, where the latter is an organic liquid, the membrane material is organophilic and therefore is wettable by the organic liquid in preference to wetting by an aqueous solution. Materials from which suitable membranes can be formed are cellulose acetate, polyethylene, polyvinylchloride, polyvinylacetate, copolymer of vinyl chloride and vinylacetate, and others. Preferably such membranes are quite thin, the thickness lying approximately in the range between about 3 to 10 mil inches.

It will be apparent that the membrane disposed across the enclosure ends, together with the enclosures, form two reservoirs, one for the body of electrolyte and the other for the body of ion-exchange liquid, distinct and separate from one another with however, a liquid transport bath being provided between the reservoirs by the interconnected pores of the membrane.

As means for retaining the membrane in sealing relation, but also and primarily, as means for masking or sealing the membrane (except for part of a surface opposite to the surface in contact with the electrolyte) from the solution under test, there is provided, in the form shown, cap 30. The latter is shaped to fit about the periphery of the membrane-sealed end of enclosure 20, as by threaded engagement therewith, and also to fit in liquid-tight relationship to the membrane itself wherever the two are immediately adjacent one another. Cap 30 includes central aperture 32 located such that when the cap is in liquid-tight relation to the membrane, the surface of membrane 28 opposite to the surface contacted by electrolyte body 26 is exposed through aperture 32. Cap 30 of course is electrically non-conductive and chemically inert, e.g. made of polytetrafluorethylene.

Lastly, immersed directly in electrolyte body 26 is reference electrode 34, i.e. means providing an electronically conductive path from the electrolyte and exhibiting a stable contact potential with the electrolyte. Such reference electrodes are well known in the art and typically (where the electrolyte is, for example, a saturated aqueous solution of KCl) is a standard Ag-AgCl electrode. The electrode of FIG. 1 can further include conventional means for capping the ends of the enclosures opposite to membrane 28 and for supporting and sealing reference electrode 34 in proper orientation.

The electrode of FIG. 1 is used simply by immersing the end bearing cap 30 into the solution under test until the surface membrane 28 exposed by aperture 32 contacts the solution. Due to ion exchange at the interfacial surface between the ion-exchange liquid in the membrane and the test solution, a Nernstian potential arises. As well known in the art, if the test soltuion is also in contact with the usual reference half-cell, such as the well-known calomel electrode, the potential between the electrode of FIG. 1 and the calomel reference electrode can be readily ascertained by a potentiometric device such as a vacuum tube voltmeter.

Now, when the electrode of the invention is in contact with an aqueous test solution, because the organic ion-exchange liquid (or its component solvent and exchanger) has some finite solubility in water some diffusion of the ion-exchange liquid into the test solution or the electrolyte body (if liquid) will occur, if only in a minute quantity over a protracted period. Because the membrane is organophilic, diffusion of the aqueous phases into the membrane is of considerably lesser magnitude and can be ignored as a perturbing factor, but only if the organic liquid phase in the membrane is maintained in sufficient volume to keep the porous structure filled. This is accomplished by the structure of the present invention because the porous membrane, providing a preferential liquid transport path between the reservoir of organic phase on the one hand and the aqueous test solution and electrolyte on the other hand, acts as a wick. The pores of the membrane are of appropriate dimensions to provide capillarity which continually supplies the organic phase to the membrane to replace any diffused into either the aqueous electrolyte or test solution. The preferential wetting of the membrane by the organic phase effectively prevents the aqueous phase from displacing the organic phase in the membrane to any significant extent.

Further, where the ion-exchanger liquid is a mixture of solvent and exchanger, the latter may exhibit some solubility in water and therefore can be leached from the solvent, creating a concentration gradient of the neutral exchanger species within the membrane. However, the liquid transport path through the pores (assuming sufficient average pore dimensions) allows diffusion of exchanger, from what can be considered an infinite reservoir of exchanger, through the solvent to the surfaces at which leaching may be occurring. This diffusion of exchanger effectively eliminates or minimizes any concentration gradients of the neutral exchanger species in the membrane due to leaching of that exchanger species into the aqueous phase.

It will be remembered that the exchanger liquid should be substantially immiscible with the aqueous test solution. Such immiscibility generally arises where the exchanger possesses as part of the exchanger ion, an organic group (e.g. alkyl, aryl, alkaryl or the like) sufficiently massive (e.g. a chain of six or more carbon atoms) to inhibit solubility in water. Thus, to insure that diffusion of ion-exchanger molecules in the membrane is not inhibited, the average pore diameter preferably is above about 10 millimicrons. Of course, leaching can be also limited by selecting exchangers which have minimal water solubility.

The limitation on mobility of exchanger ions through the pores by providing membranes with reduced average pore diameter can be highly advantageous. If the pore diameter is so small that the diffusion mobility of the high molecular weight or massive exchanger salt of a divalent ion is restricted, then that exchanger salt can be considered frozen in the membrane, at least quasi-statically. The electrodes using ion-exchanger liquid are particularly noteworthy because certain types (depending largely on the exchanger used) show high selectivity for divalent over monovalent ions. For example, if the exchanger liquid is a mixture of calcium bis-di-2-ethylhexyl phosphate in dioctylphenylphosphonate, and is disposed in the configuration of FIG. 1 with a cellulose acetate porous membrane having pores of average diameter of about 100 millimicrons, the electrode will exhibit selectivity to Ca ions over Na ions in a test solution at about a ratio of $1 \times 10^4:1$. Now, if the membrane is replaced with another of smaller pore sizes such that the diffusion of the large molecules of the calcium salt is restricted, then it can be postulated that the charge transfer through the membrane due to the mobility of the neutral exchanger species in transferring double positive charges arising from divalent ions should be similarly restricted. However, monovalent ions such as $Na^+$ form a much smaller molecule and should readily permit transfer through the membrane of single charges arising from monovalent ions. This "monovalent" charge transfer mechanism should be unimpaired although the "divalent" charge transfer process is restricted. Where the membrane used has average pore sizes of less than about 10 millimicrons, this postulated effect is clearly seen. Actually, a membrane having pores with a 6 millimicrons average diameter exhibits, in the context described, a $Ca^{++}$ to $Na^+$ selectivity reduced to about 10:1.

The structure of the present invention not only reduces errors due to stirring artifacts and internal concentration gradients of the neutral exchanger species, but permits the use of solvents hitherto impractical for such electrodes, and yields very short response times. Heretofore, the solvents used needed sufficient low volume resistivities so that the impedance seen by an electrometric measuring device was not so high as to require prohibitively expensive measuring devices, elaborate shielding or the like. To a large measure, this requirement arose because the organic phase layer constituted its own reservoir and the thickness of the organic phase layer had necessarily been large to avoid gross changes due to solubility effects. However, in the present invention, as noted, the thickness of the effective organic phase layer is defined only by the membrane and can be merely 3 mil inches. This serves to reduce to total impedance through the layer sufficiently to allow the use of very high resistivity solvents such as pure mineral oil and with ordinary high input impedance electrometers.

To illustrate the principles of the foregoing invention, a number of electrodes were made in the configuration of FIG. 1 as described. Each such electrode incorporated a mixture of 10% by weight of calcium-bis-didecylorthophosphate as the exchanger in dioctylphenylphosphonate as the solvent, and used an Ag-AgCl internal reference. The electrodes, however, differed in the nature of the membranes employed.

A first of the electrodes had a microporous membrane in which a majority of the pores were interconnected internally, the membrane being formed of cellulose acetate material approximately 130μ thick with an average hole or pore diameter of 10 mμ, about 70% of each membrane surface being hole area. The vast majority of the pores were very close in size to the average diameter.

A second electrode also had a porous membrane of cellulose acetate, which differed from the other cellulose acetate membrane substantially only in that the average hole diameter in the surface was about 100 mμ.

A third electrode has a microporously interconnected membrane formed of "Nalfilm D-30" (believed to be a polyvinyl material. This material was about 160μ thick and had a large majority of hole sizes well within a 6 to 10 mμ range of diameters. This material is characteristically a very "spongy" or highly porous structure and was treated, before use, by wetting it with an aqueous silicone suspension, and air-drying after 24 hours, thus providing a hydrophobic surface.

In order to provide a comparative control, a fourth electrode was formed in the following manner: a tube of polyvinyl chloride was capped at one end with a membrane of porous "Lexan" (a trademark for a material believed to be a thermoplastic, carbonate-linked polymer about ⅛" thick. This material is characterized in that the majority of its pores are not interconnected and can sustain substantially no fluid transfer therethrough parallel to the membrane surfaces.

It is a porous material having about $10^5$ holes/cm.$^2$, with an average hole radius of about 1 micron. The volume of the tube behind the membrane was filled with the same mixture of exchanger and solvent used in the other electrodes, and a stable contact potential was established between the liquid exchanger and lead by imersing an Ag-AgCl reference electrode therein.

These electrodes were all tested in various solutions against standard calomel electrodes with asbestos fiber leaks, to determine stability, selectivity, and time response. The results, as measured on the usual high impedance input electrometer, are as shown in the following examples:

EXAMPLE I

A standard reference solution of 0.01 M calcium was made by dissolving $CaCl_2$ in water. A number of other aqueous solutions were made including solutions of 1 M NaCl, 01 M $MgCl_2$, 0.01 M $MgCl_2$, and about ten mixed $MaCl_2$, $CaCl_2$ solutions each having different $Mg^{++}/Ca^{++}$ ratios. Each of the four electrodes was alternately contacted with a fresh portion of the reference solution and then with one of the other solutions, until all of the solutions had been used. The same sequence of steps involving the solutions was used for each electrode. Readings were taken of the potential developed in the reference solution when approximate equilibrium had been reached.

The root mean square value, $\sigma$, of the deviations of the readings in millivolts in the reference solution from their average was computed with the following results:

| Electrode— | $\sigma$ (mv.) |
|---|---|
| #4 (thick Lexan) | 1.5 |
| #1 (thin millipore) (10 mμ holes) | 0.26 |
| #2 (thin millipore) (100 mμ holes) | 0.7 |
| #3 (thin Nalfilm) | 1.1 |

Obviously, the electrodes made according to the present invention and having thin connected-pore membranes showed superior reproducibility (stability), in the best instance by a factor of about 6, over the prior art electrode using a thicker membrane with non-connected pores and the reservoir of exchanger backing the entire-membrane.

EXAMPLE II

The selectivity of the electrodes was examined. Standard solution of 0.01 M $Ca^{++}$ and 1.0 M $Na^+$ were prepared. Each electrode was first immersed in a portion of one solution and then in the other, being cycled a number of times. Electrode potentials for each solution were read at approximate equilibrium.

The selectivity K can be approximately defined by the equation $$E = \text{constant} + \phi \log (C_1 + KC_2)$$

where

E is the potential observed,
$\phi$ is the usual constant $RT/2F$,
$C_1$ is the concentration of divalent ions in one solution in moles, and
$C_2$ is the concentration of divalent ions in the other solution in moles; or if either or both of the ions are monovalent then $C_2$ or $C_1$ as the case may be, is the square of the concentration.

Calculating K from the above where $C_2$ was the square of the concentration of $Na^+$, the following results were obtained:

| Electrode— | $K_{Na}$ |
|---|---|
| #4 | $5 \times 10^{-4}$ |
| #1 | $6 \times 10^{-4}$ |
| #2 | $7 \times 10^{-4}$ |
| #3 | $3 \times 10^{-2}$ |

It will be seen that, as between at least the electrodes #1 and #2, the selectivity for $Na^+$ with respect to $Ca^{++}$ was, within the limits of experimental error, virtually identical to the selectivity determined for the simple electrode of the prior art, i.e. electrode #4. In all cases, the markedly preferential response of the electrodes for $Ca^{++}$ over $Na^{++}$ is apparent.

EXAMPLE III

The procedure of Example II was repeated using however test solutions of 0.01 M $Ca^{++}$ and 0.01 M $Mg^{++}$, $K_{Mg}$ being computed with the following results:

| Electrode— | $K_{Mg}$ |
|---|---|
| #4 | $2.3 \times 10^{-2}$ |
| #1 | $4.8 \times 10^{-2}$ |
| #2 | $6.8 \times 10^{-2}$ |
| #3 | $3.6 \times 10^{-2}$ |

Again the selectivity of all electrodes for $Ca^{++}$ over $Mg^{++}$ is clearly demonstrated, but an improvement by a factor of about 2 or more in the selectivity of electrodes of the present invention over the selectivity of an electrode of the prior art is demonstrated for the divalent ion, $Ca^{++}$.

EXAMPLE IV

A series of mixed aqueous solutions of $CaCl_2$ and $MgCl_2$ were prepared all having substantially constant ionic concentrations of 0.01 M in which the ratio, R, of $Ca^{++}$ to the fixed molal sum of $Ca^{++}$ and $Mg^{++}$ varied from substantially zero to one, i.e.

$$(Ca^{++}) + (Mg^{++}) = 0.01 \text{ M}$$

and $$R = \frac{(Ca^{++})}{(Ca^{++}) + (Mg^{++})}$$

where the parenthetical insertions identify the ion and its concentration. In other words, R is the fraction of divalent ions present as calcium.

For each such solution the activity coefficient $K_{Mg}$ was determined for electrodes #1, #2, and #4, a second model (#4A) of electrode #4 being also tested. The resulting data were plotted graphically as shown in FIG. 2 in which the abscissa is R between the limits 1.0 and 0, and the ordinate is $K_{Mg}$ between 0.20 and $-.20$. The curves resulting from the testing of prior art electrodes #4 and #4A are shown in broken lines and identified by the electrode numbers. The curves computed on the test results of the two electrodes of the present invention are shown in solid lines and also are identified by the electrode number.

It will be immediately apparent that the curves due to the present electrodes show that the selectivity "constant" varies by only about 0.025 unit from a mean value, whereas the curves due to the prior art electrodes vary by at least about 0.075 unit from the mean value of the function. Clearly then, the selectivity of the electrodes of the present invention is more accurately reproducible.

EXAMPLE V

A number of individual aqueous solutions respectively of $Na^+$, $Ca^{++}$ and $Mg^{++}$ were prepared in various molarities between about 0.1 M to 0.001 M. Each electrode was transferred between pairs of solutions, in some instances being cycled a number of times as indicated by a double arrow. The period required for the electrode potential to reach at least 98% of its long term equilibrium or asymptotic value following contact with each test solution was measured for the electrodes of the present invention. The following table indicates the response time average following transfer between solutions indicated by the ion contained; the average was computed in the basis of at least ten tests, omitting the single worst case in each.

| Transfer | Electrode #1 | Electrode #2 | Electrode #3 |
|---|---|---|---|
| $Ca^{++} \leftrightarrow Ca^{++}$ | <10 sec. | 50 sec. | 80 sec. |
| $Ca^{++} \rightarrow Mg^{++}$ | 27 min. | 39 min. | 3 min. |
| $Mg^{++} \rightarrow Ca^{++}$ | 40 sec. | 9 min. | 5 min. |
| $Ca^{++} \rightarrow Na^+$ | 40 min. | 40 min. | 10 min. |
| $Na^+ \rightarrow Ca^{++}$ | 40 min. | 20 min. | 20 min. |

In each of the above transfers, the potential to which the electrode returned was within very stable limits i.e. <1 mv. On similar testing of the prior art electrode #4, the latter often showed comparable initial response slopes (i.e. within the first four approximately): however, in almost every case, the potential to which the electrode quickly returned was not the long term (i.e. several hours) value, indicating that the response was not short-term stable. Indeed, in the case of the transfer, $Ca^{++} \rightarrow Mg^{++}$, the prior art electrode was unstable (4 mv. peak to peak oscillations) even after 50 minutes. Thus, it was not considered feasible to continue measurement to the desired 98% of the final stable values.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. An electrode assembly sensitive to ions in solution and comprising, in combination,
   means containing a body of organic ion-exchanger liquid substantially immiscible with said solution;
   a membrane for providing at a limited area of one surface thereof an interface between said ion-exchanger liquid and said solution, said membrane being preferentially wettable by said liquid, and formed with an internally interconnected porous structure open at least in part to the surfaces of said membrane,
   means containing a body of electrolyte substantially immiscible with said liquid, said body of electrolyte being in contact with the other surface of said membrane only at an area substantially opposite to said limited area;
   said body of liquid being in contact with said membrane other than at said areas, for permeating said porous structure; and
   an electrically conductive reference electrode adapted to be in electrical contact with said electrolyte at a substantially fixed contact potential.

2. An electrode assembly as defined in claim 1 wherein said ion-exchanger liquid is an organic ion-exchange material per se or an organic ion-exchange material dissolved in an organic solvent, and said membrane is formed of an organophilic material.

3. An electrode assembling as defined in claim 1 wherein said means containing said body of liquid and said body of electrolyte are respectively outer and inner coaxial containers having substantially coplanar open ends, and said membrane is positioned to close said ends thereby forming two separate chambers joined only through the porous structure of said membrane.

4. An electrode assembly as defined in claim 1 wherein said membrane has a thickness in the range of about 3 to 10 mil inches.

5. An electrode assembly as defined in claim 1 wherein the pores in the structure are of dimensions which will provide flow of said liquid into said pores by capillarity.

6. An electrode assembly as defined in claim 1 wherein the cross-section dimension of the average pore is in the range from about 6 to 100 millimicrons.

7. An electrode assembly as defined in claim 6 wherein said membrane is formed of a synthetic high molecular weight polymeric material substantially insoluble in said electroyle, solution and liquid.

8. An electrode assembly as defined in claim 1 wherein said liquid includes an exchanger having a preferential selectivity for divalent over monovalent cations.

References Cited
UNITED STATES PATENTS
2,913,386  11/1959  Clark _____ 204—195

FOREIGN PATENTS
668,409  2/1966  Belgium.

OTHER REFERENCES
"JACS," vol. 86, May 5, 1964, pp. 1901 and 1902.
Lewis et al.: "J. of the Electrochemical Soc.," vol. 106, No. 4, April, 1959, pp. 347–354.

JOHN H. MACK, *Primary Examiner.*

T. TUNG, *Assistant Examiner.*

U.S. Cl. X.R.
204—296